Aug. 3, 1948.     B. H. EATON     2,446,219
COOLING SYSTEM LEAK DETECTOR
Filed Feb. 16, 1945
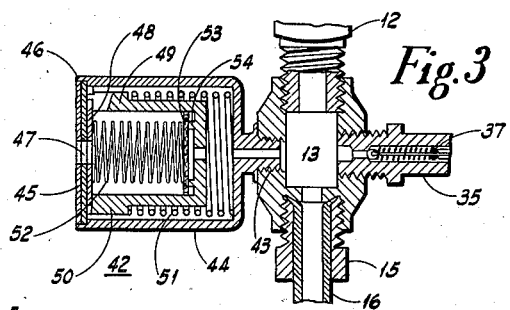
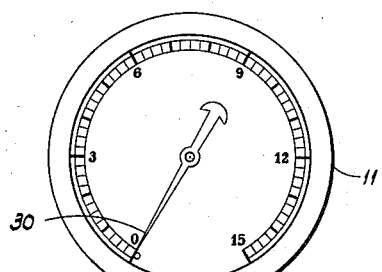
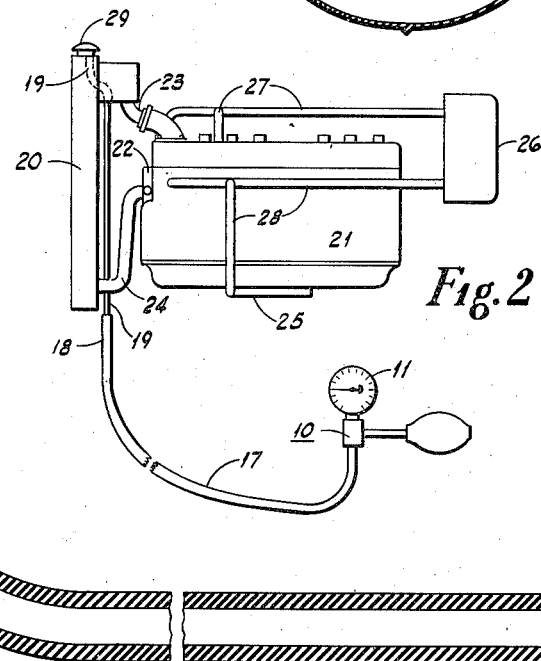
INVENTOR.
Belden H. Eaton,
BY Edward A. Lawrence.
his attorney.

Patented Aug. 3, 1948

2,446,219

UNITED STATES PATENT OFFICE 2,446,219

COOLING SYSTEM LEAK DETECTOR

Belden H. Eaton, Allison Park, Pa.

Application February 16, 1945, Serial No. 578,199

3 Claims. (Cl. 73—40)

This invention relates generally to apparatus for testing cooling systems and more particularly to apparatus for applying pressure to a cooling system to determine and locate a leak in the cooling system.

The principal object of this invention is the provision of an apparatus for supplying and retaining pressure on the liquid coolant in the cooling system of an internal combustion engine to determine if the system is free of leaks.

Another object is to provide an apparatus for supplying and retaining fluid pressure on the liquid coolant in a leaking cooling system of an internal combustion engine to locate such leak by visual inspection. The leak will either wet the part around the opening or produce a fine stream.

Another object is the provision of apparatus for checking cooling systems by applying limited fluid pressure thereto.

Another object is the provision of a leak detector for auto and truck type cooling systems which does not require any change in the system.

Another object is the provision of a simple and quick method and apparatus for checking the cooling system of an internal combustion engine for leaks that cause the loss of anti-freezing liquid and which indicate that the cooling system is inefficient and should be cleaned or otherwise repaired.

The cooling system of an internal combustion engine ordinarily includes a thermosyphon liquid circuit wherein the liquid travels through passages in the engine block and head and then through a radiator or radiator accessories, such as a liquid heater or cooler. The heater may be in the cab of the vehicle or it may be employed to heat the oil in the lubricating sump or pan of the engine in winter and cool it in the summer. The main cooling circuit is between the radiator and the engine and the heaters are connected in multiple therewith. The coolant liquid is circulated through the system by a thermal syphon action which is boosted by a pump driven from the engine. The pump when supplied moves the coolant to the top of the radiator. The hot coolant then circulates down through the radiator becoming cooler and flows back into the engine block and head. The liquid coolant will circulate without the aid of the pump. However restrictions in the system, such as a thermostatic valve in the circuit between the engine and the radiator materially reduces the thermosyphon action and a booster pump is therefore desirable to provide good circulation in the cooling system. But restrictions are also caused by deposits from the liquid coolant and if the restriction is between the pump and radiator the former may develop a pressure, creating a leak in the system. If the leak is to the exterior of the engine block, head, the hose connections or the radiator the leaking coolant may wet that portion adjacent the leak or it may show as a stream if it is large and if pressure is applied to the coolant. The radiator cap seals the top of the radiator but the latter is open to atmosphere through the overflow pipe. When the pressure device with the gauge is attached to the overflow pipe of the cooling system, the cooling system is sealed, and when pressure is applied it will be maintained if there is no leak in the system, but the pressure will drop perceptibly if a leak is present. If the leak cannot be detected from the exterior of the engine or the radiator but is evident by the drop of the pressure gauge it is quite evident that the leak is in the cylinder and probably due to the gasket. This invention is directed to the apparatus for applying pressure to the system by a simple and efficient structure.

Other objects and advantages appear hereinafter in the following description and claims.

A practical embodiment illustrating the principles of this invention is shown in the accompanying drawings wherein:

Fig. 1 is a vertical sectional view of the cooling system leak tester.

Fig. 2 is an elevational view illustrating the application of the leak tester applied to the cooling system of an internal combustion engine.

Fig. 3 is a modification of the cooling system leak tester apparatus.

Referring to Figs. 1 and 2 of the drawings, the leak detector 10 comprises the pressure gauge 11 which preferably registers from zero to fifteen pounds' gauge. The gauge is provided with the threaded nipple 12 for attaching the same to one threaded end of the bore 13 of the T-fitting 14. The other end of the bore 13 is likewise threaded to receive the threaded end of the adapter 15 which clamps the flared end of the tube 16 to the fitting. The outer diameter of the tube 16 is of such size as to snugly receive the end of a flexible tube or hose 17 which may be made of any suitable flexible material such as rubber. The flexible tube 17 should be of such length as to enable the operator to attach the free or open end 18 to the end of the overflow pipe 19 on the radiator 20 through which the cooling liquid of the internal combustion engine 21 must flow to be cooled. A pump 22 is provided in the internal combustion engine 21 for circulating the water from the head of the engine through the upper hose connection 23 to the top of the radiator 20 down through which it flows to the lower end of the radiator 20 wherein it is cooled and returns to the engine block through the housing connection 24. Circulation of the coolant liquid is also established through radiator accessories, such as a crank case heater 25 or a car heater 26, which is illustrated at 26 in Fig. 2. The pump 22 circulates the coolant through the pipe 27, the heaters 25 and 26 and returns it to the engine block head through the pipe 28. Accessories of this character attached to the cooling system must also be checked for leaks.

By attaching the flexible tube 17 of the leak detector 10 to the end of the overflow pipe 19 and tightly securing the radiator cap 29 a controlled pressure may be applied through the hose 17 to the cooling system which is filled with liquid such as water or water mixed with an anti-freeze. This pressure is transmitted through the whole of the cooling system and if any part thereof is apt to leak under the pressure applied the cooling liquid will seep or flow through the leak, causing the pressure on the system to be quickly reduced, which reduction in pressure is indicated by the hand 30 on the pressure gauge 11 quickly returning to zero.

Any suitable means may be provided for supplying pressure to the cooling system, such as a hand pump or the rubber pressure bulb 31. The bulb 31 is provided with a check valve 32 at the inlet end and a connecting nipple 33 at the outlet end.

The T-fitting 14 is provided with a threaded opening 34 for receiving the externally threaded valve housing 35 that forms the stem of the T. The bore of the valve housing 35 is provided with a sleeve 36 having a valve seat on one end thereof arranged to be engaged by the valve member 37 secured to the valve stem 38 which is maintained on the valve seat by the valve spring 39. The outer end of the valve housing is provided with a connecting nipple 40 arranged to receive the flexible rubber hose 41, the other end of which is telescoped over the outer end of the nipple 33 secured to the pressure bulb 31.

When the leak detector is attached to the overflow pipe 19 of the filled coolant system, fluid pressure may be exerted on the cooling system by squeezing the bulb a comparatively few number of times. The cooling system of a newly manufactured internal combustion engine should be capable of withstanding approximately seven to eight pounds gauge pressure without leaking and the cooling system of a used automobile should be capable of withstanding five pounds pressure without leaking. If either of such cooling systems or auxiliary accessory attachments were found to leak at these pressures they would be found to operate inefficiently, owing to the fact that they would lose a sufficient amount of the coolant to cause the engine to overheat. An overheated engine block may expand beyond its normal limit of expansion causing it to crack or otherwise rupture, and producing an additional leak in the cooling system and a greater loss.

Again if a slight pressure is subjected by the detector, the seal of the water in the pump of an engine may show a leak due to the wear of the seal or a poor fit in the bearings and the seal of a new pump which would not ordinarily be found or expected in a new car.

If a leak occurs in the cooling system when pressure is supplied thereto the hand 30 of the pressure gauge will immediately fall when the operator stops pumping, which indicates that there is a leak in the cooling system. By inspection of the whole of the cooling system the operator may see the coolant flowing from the leak if it is sufficiently large to emit a stream of the coolant or if small it will ordinarily wet the area around the leak, thus enabling the operator to readily locate and repair the same. If the indicator 30 falls and no leak can be detected and the operator is assured that the external portion of the system is tight it is quite likely that the leak in the cooling system is into the cylinders of the engine by reason of a faulty gasket. This may be further checked by testing the engine while it is cold and not running and again testing the engine when it is warm and running. Such a leak may occur while the engine is not operating but stop when the engine is operating and has expanded sufficiently to stop the leak.

The ordinary leaks of a cooling system are usually around the hose connections, in the radiator, or the gasket between the block and the engine head, which leaks can readily be seen by the operator when pressure is applied to the system.

In order to prevent the operator from applying a pressure that is too high for the cooling system the Quinn safety valve 42 is connected to the fitting through a fourth opening 43 and comprises a housing 44 having a threaded nipple for connecting to the bore 13 to the chamber in the housing which is closed at its other end by the plate 45 held in position by the peened edges 46 of the housing 44. The inner surface of the closure plate 45 is provided with a valve seat member 47 arranged to receive the valve member 48 which is secured to the outer end of the hollow piston 49 operable within the housing chamber. The plate 45, the valve seat 47 and the valve member 48 have aligned openings concentric with the piston 49 and open the bore of the latter to atmosphere. The piston 49 is provided with an external shoulder 50 arranged to receive one end of the coil spring 51, the other end of which is initially compressed against the inner end wall of the chamber in the housing 44. A coil spring 52 is compressed within the hollow piston 49 and engages the valve member 48 and the valve member 53 which engages the concentric annular valve seat 54 on the inner end of the hollow piston member 49. This Quinn safety valve is known in the art and can be set to open when subjected to a predetermined pressure and allows the air to escape from the bore 13 through the opening 43. The pressure is exerted on the valve 53, lifting the latter from its seat 54 by further compressing the spring 52. The valve spring 52 may be calibrated to release a pressure greater than five to ten pounds per square inch and thus prevent the operator from applying an exorbitant pressure on the cooling system. The Quinn safety valve will also admit air to the bore 13 through the opening 43 if the latter is subjected to a vacuum sufficiently less to permit the atmospheric pressure acting upon the interior of the piston 49 to compress the spring 51 and admit air between the valve 48 and the valve seat 47. The air travels around the exterior of the piston and into the bore of the fitting.

The bulb pump 31 with the check valves 32 and 37 provides an adequate means for supplying the low pressure required for this leak detector. When the radiator is filled the air in the tube 16, the hose 17 and the overflow pipe 19 does not represent a very large volume and is quickly compressed by a few strokes of the bulb pump 31 to obtain the pressure required on the system. This simple and efficient apparatus enables the operator to locate a leak before it has had an opportunity to cause any damage and thus avoid the loss of material, equipment and labor.

I claim:

1. In a leak detector for a closed and filled thermosyphon liquid cooling system for automobiles and the like the combination of a bulb pump having valved inlet and outlet openings, a pressure gauge connected to the outlet opening, and a flexible hose for connecting the outlet opening to a closed liquid cooling system for applying a static pressure on the liquid coolant in the system.

2. In a leak detector for a closed and filled liquid cooling system of an internal combustion engine the combination of an air pump, a fitting having a chamber with four openings, a pressure reading device connected to one opening of the fitting, a check valve connected to the second opening of the fitting, means for connecting the air pump to the check valve to supply air under pressure to the fitting, a pressure release valve arranged to be adjusted to a predetermined pressure and connected to the third opening of the fitting, and a flexible hose connected to the fourth opening of the fitting and arranged for connection directly to the liquid cooling system of the engine for applying a static pressure on the liquid coolant in the system.

3. In a leak detector for a closed and filled circulatory liquid system the combination of an air pump, a fitting having a chamber with a plurality of openings, means for connecting the air pump to an opening of the fitting, a safety valve connected to a second opening of the fitting for releasing pressures above a predetermined amount, and a flexible hose connected to a third opening of the fitting and arranged to supply the air under pressure from the fitting directly to the closed liquid cooling system for applying a static pressure on the liquid in the system.

BELDEN H. EATON.

REFERENCES CITED

The following references are of record in the file of this patent:

UNITED STATES PATENTS

| Number | Name | Date |
|---|---|---|
| 1,613,150 | Zore | Jan. 4, 1927 |
| 1,764,616 | Fleming | June 17, 1930 |
| 1,778,563 | Peck | Oct. 14, 1930 |
| 2,003,949 | Morgan | June 4, 1935 |
| 2,018,403 | Hussar | Oct. 22, 1935 |
| 2,178,901 | Webster | Nov. 7, 1939 |